US012646338B2

(12) United States Patent
Peng et al.

(10) Patent No.: US 12,646,338 B2
(45) Date of Patent: Jun. 2, 2026

(54) PORT DISTRICT SEA LINE MULTIPLE VESSEL MONITORING SYSTEM AND OPERATING METHOD THEREOF

(71) Applicant: Ship and Ocean Industries R&D Center, New Taipei City (TW)

(72) Inventors: Yu-Ting Peng, Kaohsiung City (TW); Yan-Sheng Song, Kaohsiung City (TW); Chia-Yu Wu, Kaohsiung City (TW); Chien-Hung Liu, Kaohsiung City (TW)

(73) Assignee: SHIP AND OCEAN INDUSTRIES R&D CENTER, New Taipei City (TW)

( * ) Notice: Subject to any disclaimer, the term of this patent is extended or adjusted under 35 U.S.C. 154(b) by 243 days.

(21) Appl. No.: 18/518,987

(22) Filed: Nov. 25, 2023

(65) Prior Publication Data

US 2024/0177503 A1 May 30, 2024

(30) Foreign Application Priority Data

Nov. 26, 2022 (TW) .................................. 111145338

(51) Int. Cl.
 *G06V 20/58* (2022.01)
 *B63B 79/40* (2020.01)
 *G06V 20/64* (2022.01)

(52) U.S. Cl.
 CPC ............ *G06V 20/647* (2022.01); *B63B 79/40* (2020.01); *G06V 20/58* (2022.01)

(58) Field of Classification Search
 CPC ...... G06V 20/647; G06V 20/52; G06V 20/58; G06V 10/00; G06T 7/70; G06T 7/00; G06T 2207/30232; G08G 3/00; B63B 79/40
 See application file for complete search history.

(56) References Cited

U.S. PATENT DOCUMENTS

2019/0272442 A1 9/2019 Schutte et al.
2021/0357655 A1 11/2021 Park et al.

FOREIGN PATENT DOCUMENTS

| CN | 106910204 B | * | 4/2018 | ............. G06F 18/24 |
| CN | 109725310 A | | 5/2019 | |
| CN | 110874953 B | * | 9/2022 | ........... G06F 18/214 |
| CN | 115017246 A | | 9/2022 | |

(Continued)

OTHER PUBLICATIONS

Lee, Sung-Jun, Myung-Il Roh, Hye-Won Lee, Ji-Sang Ha, and Il-Guk Woo. "Image-based ship detection and classification for unmanned surface vehicle using real-time object detection neural networks." In ISOPE international ocean and polar engineering conference, pp. ISOPE-I. ISOPE, 2018. (Year: 2018).*

*Primary Examiner* — Carol W Chan
(74) *Attorney, Agent, or Firm* — Cheng-Ju Chiang

(57) ABSTRACT

The present invention discloses a port district sea line multiple vessel monitoring system and operating method thereof. Specifically, the port district sea line multiple vessel monitoring system comprises a processing module, a storage module, a camera and a floating object information receiving module. The port district sea line multiple vessel monitoring system may automatically recognize image classification of water surface object, therefore to determine operation of patrol mode, monitor mode or auxiliary recognizing mode for satisfying the needs of monitoring of port district sea line.

18 Claims, 2 Drawing Sheets

(A) Provided an abovementioned port district sea line multiple vessel monitoring system.

(B) The camera is controlled to enter a patrol mode by the processing module.

(C) the processing module recognizes the at least one image category of the at least one floating object by the object recognition via the at least one data set and determines the at least one image category of the at least one floating object to the plurality of vessel categories or the plurality of non-vessel categories.

(D) the camera is controlled to enter a monitor mode by the processing module if the at least one image category of the at least one floating object is recognized as a plurality of vessel categories. On the contrary, the camera is controlled to enter an auxiliary recognizing mode by the processing module if the at least one image category of the at least one floating object is recognized as a plurality of non-vessel categories.

(56) References Cited

FOREIGN PATENT DOCUMENTS

| | | | |
|---|---|---|---|
| TW | M628858 U | 6/2022 | |
| WO | 2021/030477 A1 | 2/2021 | |
| WO | WO-2021141338 A1 * | 7/2021 | ............... H04N 7/18 |

* cited by examiner

<u>10</u>

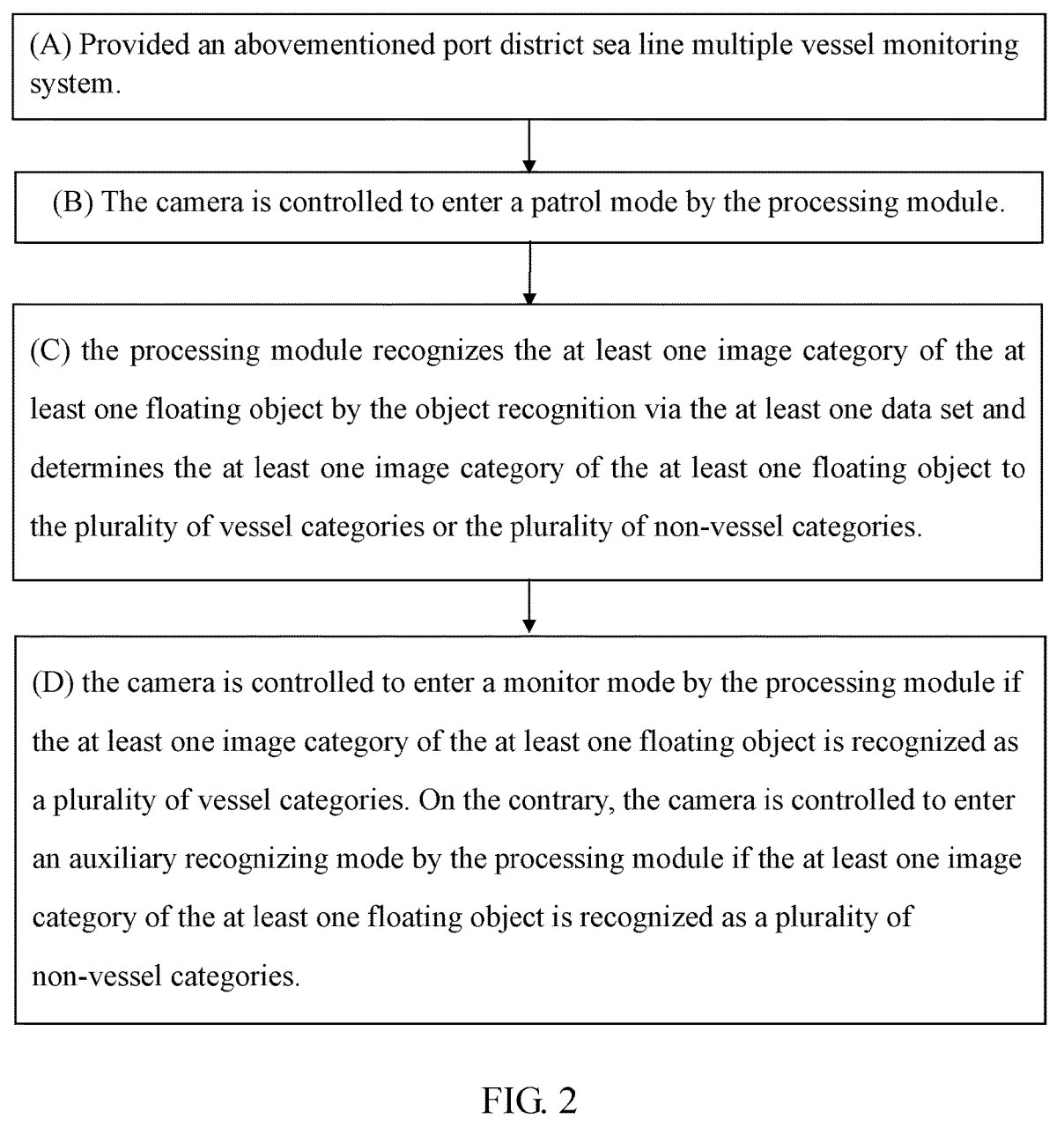

(A) Provided an abovementioned port district sea line multiple vessel monitoring system.

(B) The camera is controlled to enter a patrol mode by the processing module.

(C) the processing module recognizes the at least one image category of the at least one floating object by the object recognition via the at least one data set and determines the at least one image category of the at least one floating object to the plurality of vessel categories or the plurality of non-vessel categories.

(D) the camera is controlled to enter a monitor mode by the processing module if the at least one image category of the at least one floating object is recognized as a plurality of vessel categories. On the contrary, the camera is controlled to enter an auxiliary recognizing mode by the processing module if the at least one image category of the at least one floating object is recognized as a plurality of non-vessel categories.

FIG. 2

PORT DISTRICT SEA LINE MULTIPLE VESSEL MONITORING SYSTEM AND OPERATING METHOD THEREOF

TECHNICAL FIELD

The present invention relates to a port district sea line multiple vessel monitoring system and operating method thereof. Specifically, the present invention is a system that can integrate information and image information of the floating object, and can automatically recognize various situations of the floating object, therefore selecting the most suitable mode for monitoring the situation on the seashore of the port area.

BACKGROUND OF RELATED ARTS

Generally, there are often a large number of floating objects within the range of vision such as the port and the sea horizon. A large number of floating objects are such as vessels and other watercrafts that frequently sail into a harbor or out to a port. Hence, the system mostly manages the floating object activities via the signals of automatic identification system (AIS).

However, according to International Maritime Organization (IMO) regulations, it only requires a floating object with a displacement tonnage of more than 20 tons need to install an automatic identification system. Therefore, it is hard to recognize the identification of floating objects without installing an automatic identification system.

In light of the issues mentioned above of prior art, nowadays, the main monitor methods of the port area depend on the personnel who stare at the radar, automatic identification system receiver, camera, or other equipment at every moment all day. However, this monitor method ultimately had been executed by a lot of personnel and their time. Moreover, the attention of executing personnel also cannot keep high concentration all the time. Once an accident occurs, there is a risk that the accident cannot be spotted immediately at any time.

SUMMARY

In order to solve the above problem in prior art, the present invention provides a port district sea line multiple vessel monitoring system and operating method thereof. Specifically, the port district sea line multiple vessel monitoring system of the present invention comprises a processing module, a storage module, a camera, and a floating object information receiving module.

The storage module connects to the processing module, and the storage module comprises a vessel identity database and at least one floating object data set. Moreover, the camera connects to the processing module. The camera captures a monitor image that includes at least one floating object.

Furthermore, the floating object information receiving module connects the processing module. The camera is controlled to enter a patrol mode by the processing module. The patrol mode is the processing module recognizing the at least one image category of the at least one floating object as a plurality of vessel categories or a plurality of non-vessel categories by the object recognition via the plurality of vessel sample data and the plurality of non-vessel sample data.

The camera is controlled to enter a monitor mode by the processing module if at least one image category of the at least one floating object is recognized as a plurality of vessel categories. The camera is controlled to enter an auxiliary recognizing mode by the processing module if at least one image category of the at least one floating object is recognized as a plurality of non-vessel categories.

At the same time, the operating method of the port district sea line multiple vessel monitoring system of the present invention includes follow steps. First of all, step (A) is provided an abovementioned port district sea line multiple vessel monitoring system. Secondly, step (B) is the camera is controlled to enter a patrol mode by the processing module.

Thirdly, step (C) is the processing module recognizes the at least one image category of the at least one floating object by the object recognition via the at least one data set and determines the at least one image category of the at least one floating object to the plurality of vessel categories or the plurality of non-vessel categories.

Step (D) is the camera is controlled to enter a monitor mode by the processing module if the at least one image category of the at least one floating object is recognized as a plurality of vessel categories. On the contrary, the camera is controlled to enter an auxiliary recognizing mode by the processing module if the at least one image category of the at least one floating object is recognized as a plurality of non-vessel categories.

Moreover, the at least one floating object data set includes a plurality of vessel sample data and a plurality of non-vessel sample data in the operating method of the port district sea line multiple vessel monitoring system of the present invention.

The above-mentioned descriptions are only preferred embodiments of the present invention and are not intended to limit the scope of implementation of the present invention. Therefore, all the shapes, structures, features, and spirits described in the scope of the patent application of the present invention shall be regarded as equivalent to the changes and modifications per se, and be included in the scope of the patent application of the present invention.

BRIEF DESCRIPTION OF THE DRAWINGS

FIG. 2 is a flow chart of the operating method of the port district sea line multiple vessel monitoring system of the present invention.

DETAILED DESCRIPTION OF THE INVENTION

Figure 1:
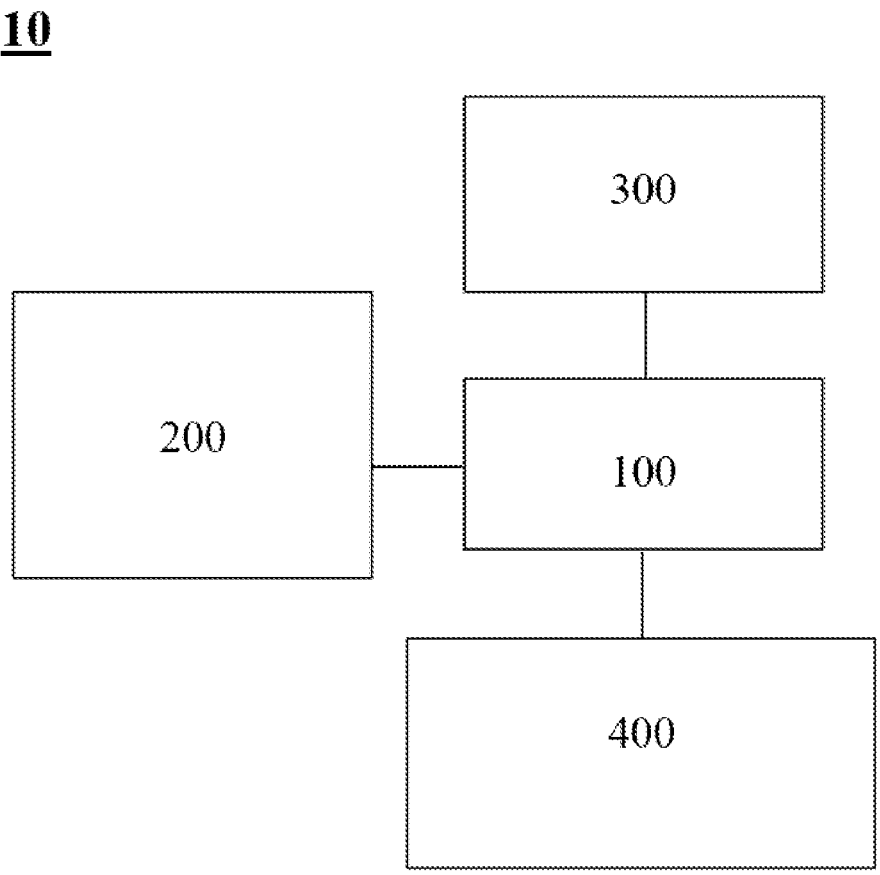
FIG. 1 is a schematic diagram of an embodiment of the port district sea line multiple vessel monitoring system of the present invention.

In order to understand the technical features and practical effects of the present invention, and to implement it according to the contents of the specification, the preferred embodiment shown in the drawings will be described in detail as follows:

The "connection" mentioned in this embodiment actually has no absolute limitation on space and position. In particular, the term "connection" should reasonably be understood to mean any physical connection that enables a function. The physical connection includes but not limited to mechanical connection, electrical connection, wired connection or wireless connection, which is not limited in the present invention.

Firstly, please refer to FIG. 1, FIG. 1 is a schematic diagram of an embodiment of the port district sea line multiple vessel monitoring system of the present invention. As shown in FIG. 1, the port district sea line multiple vessel monitoring system 10 comprises a processing module 100, a storage module 200, a camera 300, and a floating object information receiving module 400. In this embodiment, the processing module 100 may connect to the camera 300.

Specifically, the camera 300 of this embodiment may be a visible light camera or an invisible light camera. Moreover, an invisible light camera may be a thermal imaging camera. In an environment where visible light is sufficient, the number of the camera 300 of this embodiment can be multiple. According to different port locations, the number of the camera 300 is not limited in this invention.

Since the position of the camera 300 will affect its field of view. Therefore, the camera 300 can further include the camera positioning information to determine its GPS coordinates and match to the rotated lens angle for position confirmation. Undoubtedly, in this embodiment, the camera 300 may have a built-in global positioning system (GPS), a built-in inertial measurement unit (IMU), or a related function unit combination thereof, which is not limited by the present invention.

In addition, the camera 300 of this embodiment may rotate the lens per se in three dimensions. The described motion of camera 300 means the lens of a camera may pan, tile, and zoom. Furthermore, to achieve the abovementioned motion the camera has to be rotated. The best rotating angle of the camera 300 of this embodiment is preferably 120 degrees per second, which is not limited by the present invention.

Additionally, the resolution of the recording video data of the camera 300 of this embodiment may be 2K to 4K (e.g., 3840×2160 pixels). Moreover, the camera 300 has an optical magnification lens of at least 30 times and a digital magnification capability of at least 8 times. In addition, the long-range sight of the camera 300 needs to meet the requirements of at least 500-6000 meters.

The processing module 100 of this embodiment can further execute object recognition for floating objects via the monitor screen of the camera 300. Specifically, this embodiment can execute object recognition for floating objects to confirm the image category of the floating object.

The described object recognition is also performed by the processing module 100 executing the image recognizing artificial intelligence model. Specifically, the storage module 200 of this embodiment can save the image recognizing artificial intelligence model by the processing module 100 executing for detecting or recognizing floating objects that appeared on the monitor screen of the camera 300.

Certainly, the image recognizing artificial intelligence model also can be saved or read in a cloud server by the processing module 100 via the internet. Moreover, when the processing module 100 is configured on the camera 300 in the form of a single-chip microcomputer, the image recognition artificial intelligence model can also be performed in the camera 300, which is not limited by the present invention.

Specifically, in this embodiment, the image recognition artificial intelligence model performed by the processing module 100 is yolov3-tiny. The image recognizing artificial intelligence model uses at least one floating object data set stored in the storage module 200 for training and implemented after confirming that the detection and identification accuracy rates are above 85%.

Therefore, the floating object within 1500 meters from camera 300 can achieve more than 85% detection and recognition accuracy without optical or digital magnification after training in this embodiment, and the image recognizing artificial intelligence model executed by the processing module 100 can coordinate with the specification of the camera. Moreover, when the floating object is more than 1500 meters away from camera 300, camera 300 can be controlled in optical or digital magnified means by the processing module 100 to track the floating object within 500 to 6000 meters of camera 300 for assisting in recognizing.

Therefore, the processing module 100 of this embodiment can recognize the image category of the floating object by object recognition that is based on at least one floating object data set which saves on the storage module 200. In this embodiment, the floating object data set includes a plurality of vessel sample data and a plurality of non-vessel sample data. The image category may include but not limited to a plurality of vessel categories or a plurality of non-vessel categories.

Specifically, the identifiable image categories in this embodiment are determined by the image recognition artificial intelligence model run by the processing module 100. Furthermore, the abovementioned image recognizing artificial intelligence model can determine image category after training by a plurality of vessel sample data and a plurality of non-vessel sample data which is saved on the floating object data set of the storage module 200.

In other words, if the image recognition artificial intelligence model run by the processing module 100 can perform object recognition according to but not limited to a plurality of vessel sample data and a plurality of non-vessel sample data of the floating object data set. The described plurality of vessel sample data comprise airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof. Moreover, a plurality of non-vessel sample data comprise people, floating, buoy, driftwood or combination thereof.

On the contrary, a plurality of vessel categories the image category of this embodiment comprises airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof. Moreover, a plurality of non-vessel categories comprise people, floating, buoy, driftwood or combination thereof.

Furthermore, in this embodiment, the storage module 200 connecting to the processing module 100 had saved at least one floating object data set, and the storage module 200 may be a solid-state disk (SSD), etc. In the at least one floating object data set, the samples have been manually marked and provided to detect and recognize the position and category of the floating object. Actually, the processing module 100 of this embodiment may include a central processing unit, a graphics processing unit, a single-chip microcomputer, or a combination thereof that performs image recognition artificial intelligence.

The floating object information receiving module 400 of this embodiment is also connected with the processing module 100. In this embodiment, the described floating object information receiving module 400 may include an automatic identification system receiver, radar, or combination thereof. Specifically, the floating object information receiving module 400 of this embodiment can receive an automatic identification system signal (AIS) or a radar signal of a floating object within 4000-6000 meters.

Hence, the floating object information receiving module 400 of this embodiment receives floating object information within a period of time and transmits the obtained information to the processing module 100. In this embodiment, the period of time of the floating object information receiving module 400 can be set as 60 to 180 seconds. The receiving data in the setting time period be discarded if the time is out the range of 60 to 180 seconds. The plurality of floating object information in this embodiment referred to automatic identification system signal.

Furthermore, the described automatic identification system signal includes a global positioning system coordination, a vessel category, a maritime mobile service identity (MMSI), vessel name, vessel velocity, vessel heading or combinations thereof. Basically, the abovementioned floating object data is created by variety of vessels. Hence, the vessel types of the floating object information receiving module 400 of this embodiment should include but not limit to airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel or combinations thereof.

Considering that automatic identification system may be updated its vessel category when the automatic identification system updates relevant vessel categories, the floating object data set of this embodiment also can add a new data set to the data set to make the processing module 100 have a comprehensive recognition.

In the embodiment, when port district sea line multiple vessel monitoring system 10 is in a normal state, the camera 300 is controlled to enter a patrol mode by the processing module 100. Specifically, the described patrol mode is the processing module 100 recognizes at least one image category of the at least one floating object as a plurality of vessel categories or a plurality of non-vessel categories via an object recognition from the plurality of vessel sample data and the plurality of non-vessel sample data.

The camera 300 is controlled to enter a monitor mode by the processing module 100 if at least one image category of the at least one floating object is recognized as a plurality of vessel categories. On the contrary, the camera 300 is controlled to enter an auxiliary recognizing mode by the processing module 100 if at least one image category of the at least one floating object is recognized as a plurality of non-vessel categories. The described monitor mode is that the floating object information receiving module 400 scans a plurality of floating object information.

In order to understand system 10 how to perform in the patrol mode, monitoring mode, and auxiliary identification mode described in this embodiment. Please refer to FIG. 1 and FIG. 2 simultaneously. FIG. 2 is a flow chart of the operating method of the port district sea line multiple vessel monitoring system of the present invention.

As shown in FIG. 2, in this embodiment, step (A) is providing a port district sea line multiple vessel monitoring system 10 as described in the previous embodiment (such as FIG. 1). The next step (B) is the camera 300 is controlled to enter a patrol mode by the processing module 100. In this embodiment, the patrol mode is merely the processing module 100 that controls the camera 300 to scan the floating object in the port district sea line at the widest possible angle of lens movement and recognizes them simultaneously.

As previously described, the recognizing method is step (C), the processing module 100 recognizes the at least one image category of the at least one floating object by the object recognition via the at least one floating object data set and determines the at least one image category of the at least one floating object to the plurality of vessel categories or the plurality of non-vessel categories.

In the final step (D) of this embodiment, the camera 300 is controlled to enter a monitor mode by the processing module 100 if the at least one image category of the at least one floating object is recognized as a plurality of vessel categories. The camera 300 controlled to enter an auxiliary recognizing mode by the processing module 100 if the at least one image category of the at least one floating object is recognized as a plurality of non-vessel categories.

Specifically, the object recognition described in step (C) is also achieved by the processing module 100 executing image recognizing artificial intelligence model. Furthermore, the monitor mode of this embodiment is only when the distant floating object can be initially identified as a vessel by image.

Firstly, the monitor mode of this embodiment will execute the step (S100), the floating object information receiving module 400 scans a plurality of floating object information and transmitting to the processing module 100. If the processing module 100 receives the plurality of floating object information and then executing step (S101). If a plurality of floating object information is not received by the processing module 100 and then execute step (S102).

Specifically, step (S100) is used for determining whether the vessel has activated the automatic identification system as a basis for distinction. Furthermore, when the processing module 100 receives a plurality of floating object information and then execute step (S101). Step (S101) is the processing module 100 transmits a plurality of floating object information to the storage module 200 for saving it. Moreover, the processing module 100 confirms whether the plurality of floating object information can match at least one saved vessel information in the vessel identity database of the storage module 200. If the plurality of floating object information and saved vessel information match each other and then execute step (S1011). If the plurality of floating object information and saved vessel information do not match each other and then execute step (S1012).

In the embodiment, the vessel identity database is a vessel that has registered the relevant port area as its home port or one of a sightseeing yacht team. In other word, the abovementioned saved vessel information is used for determining whether the floating object captured by the camera 300 is a vessel and the floating object and determining whether the floating object is a vessel under the jurisdiction of the system administrator of the port district sea line multiple vessel monitoring system 10.

Therefore, if the floating object is a vessel under the jurisdiction of the system administrator of the port district sea line multiple vessel monitoring system 10, step (S1011) is the camera 300 is kept executing the monitor mode for tracking the floating object by the processing module 100. On the contrary, if the floating object belongs to an external vessel, step (S1012) is the processing module 100 notify the plurality of floating object information to the system administrator and the system administrator of port district sea line multiple vessel monitoring system 10 will decide relevant disposals.

On the other hand, it means that there are not any floating objects or be not turned on the automatic identification system when the floating object information receiving module 400 cannot receive any floating object information. Hence, step (S102) is the processing module 100 recognizes the at least one image category of the at least one floating object as the plurality of vessel categories or the plurality of non-vessel categories by the object recognition via the plurality of vessel sample data or the plurality of non-vessel sample data.

If the at least one image category of the at least one floating object belongs to the plurality of vessel categories, the processing module 100 will map at least one floating object to the appropriate plurality of floating object information by the plurality of vessel categories and then execute step (S101). In the other words, step (S102) is directly determining whether the floating object is a vessel under the jurisdiction of the system administrator of the port district sea line multiple vessel monitoring system 10.

On the contrary, in the step (S102), the camera 300 is controlled to enter an auxiliary recognizing mode by the processing module 100 if the at least one image category of the at least one floating object is recognized as a plurality of non-vessel categories. Specifically, in the step (S102), if the floating object is determined to non-vessel categories, the floating object may be a floating obstacle on the water such as driftwood, buoy, huge waste, marine organisms, person overbroad or other more urgent situations. Hence, the auxiliary recognizing mode of this embodiment is the processing module 100 control the magnification method of the camera 300 to increase the recognizing ability for the floating object.

Specifically, the auxiliary recognizing mode of this embodiment is executing step (S201) that the processing module 100 determines the at least one image category of the at least one floating object to the people (such as a person overbroad) of the plurality of non-vessel category. If the at least one image category belongs to the people, and then firstly executed step (S2011). If at least one image category does not belong to the people, and then executed step (S202).

In view of impossibility in initial determination is a person overbroad who have to be rescued. Hence, step (S2011) is used for confirming the image recognizing category of the floating object via an optical magnified mean. Specifically, step (S2011) is the processing module 100 controls the camera 300 to optically magnify the at least one floating object and recognizes the at least one image category of the at least one floating object as the plurality of vessel categories or the plurality of non-vessel categories.

When the image category of the floating object belongs to the plurality of vessel categories due to misjudgment, go back to the above step (S102) of monitor mode. On the contrary, the image category of the floating object belongs to the plurality of non-vessel categories, and then execute step (S2012) for further confirming whether the floating object is a person overbroad who have to be rescued.

Step (S2012) is the processing module 100 recognizes the at least one image category of the at least one floating object as the people of the plurality of non-vessel category via the object recognition. If the at least one image category belongs to people and then execute step (S1012). If the at least one image category does not belong to people and then execute step (S202). Therein, step (S1012) is the processing module 100 notify the plurality of floating object information to the system administrator. In this embodiment, when the system executes step (S2012) and then execute step 1012, the floating object information will be an alarming message for a person needing to rescue not an abovementioned automatic identification system message.

On the contrary, when the confirming result is not a person overbroad by step (S201) or step (S2012), the processing module 100 will control the camera 300 to determine the at least one image category of the at least one floating object to the plurality of non-vessel categories. If the category of at least one image has been recognized to belong in the plurality of non-vessel categories, then execute step (S203). If the category of the image cannot be recognized, then execute step (S2021).

In this embodiment, step (S2021) is the processing module 100 defines the at least one floating object to at least one new object and notifies the system administrator. The reason is that the port district sea line multiple vessel monitoring system 10 of this embodiment cannot recognize the category of at least one floating object when emergency requests are excluded. Therefore, the category of at least one floating object need to dispose or determine by system administrator of port district sea line multiple vessel monitoring system 10. On the contrary, step (S203) is the processing module 100 transmits the at least one floating object which is recognized as the plurality of non-vessel categories to the storage module 200 for saving.

Step (S203) is the port district sea line multiple vessel monitoring system 10 of this embodiment can recognize identifiable floating objects (such as obstacles) without immediate danger within the field of vision. Therefore, the port district sea line multiple vessel monitoring system 10 only records related floating object categories.

The above-mentioned descriptions are only preferred embodiments of the present invention and are not intended to limit the scope of implementation of the present invention. Therefore, all the shapes, structures, features, and spirits described in the scope of the patent application of the present invention shall be regarded as equivalent to the changes and modifications per se, and be included in the scope of the patent application of the present invention.

What is claimed is:

1. A port district sea line multiple vessel monitoring system, comprising:

a processing module;

a storage module connecting to the processing module, and the storage module comprising:

a vessel identity data set;

at least one floating object data set having a plurality of vessel sample data and a plurality of non-vessel sample data;

a camera connecting to the processing module and capturing a monitor image including at least one floating object; and a floating object information receiving module connecting to the processing module;

wherein the camera is controlled to enter a patrol mode by the processing module;

wherein while the camera is in the patrol mode, the processing module recognizes at least one image category of the at least one floating object as a plurality of vessel categories or a plurality of non-vessel categories via an object recognition from the plurality of vessel sample data and the plurality of non-vessel sample data;

wherein if the at least one image category of the at least one floating object is recognized as the plurality of vessel categories, the camera is controlled to enter a monitor mode by the processing module;

wherein if the at least one image category of the at least one floating object is recognized as the plurality of non-vessel categories, the camera is controlled to enter an auxiliary recognizing mode by the processing module.

2. The port district sea line multiple vessel monitoring system of claim 1, wherein the processing module comprises a central processing unit.

3. The port district sea line multiple vessel monitoring system of claim 1, wherein the processing module comprises a graphics processing unit.

4. The port district sea line multiple vessel monitoring system of claim 1, wherein the camera is a visible light camera or an invisible light camera.

5. The port district sea line multiple vessel monitoring system of claim 1, wherein the floating object information receiving module scans a plurality of floating objects information in the monitor mode.

6. The port district sea line multiple vessel monitoring system of claim 5, wherein the plurality of floating objects information are automatic identification system signals, and the plurality of floating objects information includes global positioning system coordination, vessel category, and maritime mobile service identity (MMSI).

7. The port district sea line multiple vessel monitoring system of claim 6, wherein the plurality of floating object objects information further includes vessel name, vessel velocity, vessel heading or combinations thereof.

8. The port district sea line multiple vessel monitoring system of claim 1, wherein the floating object information receiving module is an automatic identification system receiver, a radar or combinations thereof.

9. The port district sea line multiple vessel monitoring system of claim 1, wherein the plurality of vessel categories comprise airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof; and the plurality of non-vessel categories comprise people, buoy, driftwood or combination thereof.

10. The port district sea line multiple vessel monitoring system of claim 1, wherein the plurality of vessel sample data comprise airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof; and the plurality of non-vessel sample data comprise people, buoy, driftwood or combination thereof.

11. The port district sea line multiple vessel monitoring system of claim 1, wherein the processing module further connects to a display module.

12. An operating method of the port district sea line multiple vessel monitoring system of claim 1, comprising:
  (A) providing the port district sea line multiple vessel monitoring system;
  (B) controlling the camera to enter a patrol mode by the processing module;
  (C) recognizing, by the processing module, the at least one image category of the at least one floating object by the object recognition via the at least one floating object data set and determining that the at least one image category of the at least one floating object is the plurality of vessel categories or the plurality of non-vessel categories; and
  (D) controlling the camera to enter the monitor mode by the processing module if the at least one image category of the at least one floating object is recognized as the plurality of vessel categories;
  controlling the camera to enter an auxiliary recognizing mode by the processing module if the at least one image category of the at least one floating object is recognized as the plurality of non-vessel categories;
  wherein the at least one floating object data set includes the plurality of vessel sample data and the plurality of non-vessel sample data.

13. The operating method of claim 12, wherein the monitor mode comprises:
  step (S100): scanning, by the floating object information receiving module, a plurality of floating objects information and transmitting to the processing module;
  wherein if the processing module receives the plurality of floating objects information, execute step (S101);
  if the plurality of floating objects information is not received by the processing module, execute step (S102);
    wherein step (S101) comprises transmitting, by the processing module, the plurality of floating objects information to the storage module for saving, and confirming, by the processing module, whether the plurality of floating objects information can match at least one saved vessel information in the vessel identity data set of the storage module;
    wherein if the plurality of floating objects information and the at least one saved vessel information in the vessel identity data set of the storage module are matched to each other, execute step (S1011); if the plurality of floating objects information and the at least one saved vessel information in the vessel identity data set of the storage module are not matched to each other, execute step (S1012);
    wherein step (S1011) comprises controlling the camera to remain in the monitor mode by the processing module for tracking the at least one floating object;
    wherein step (S1012) comprises notifying, by the processing module, a system administrator of the plurality of floating objects information;
  wherein step (S102) comprises recognizing, by the processing module, the at least one image category of the at least one floating object as the plurality of vessel categories or the plurality of non-vessel categories by the object recognition via the plurality of vessel sample data or the plurality of non-vessel sample data;
  mapping, by the processing module, the at least one floating object to an appropriate floating object information by the plurality of vessel categories, and then executing step (S101) if the at least one image category of the at least one floating object is determined to be the plurality of vessel categories;
  controlling the camera to enter an auxiliary recognizing mode by the processing module if the at least one image category of the at least one floating object is recognized as the plurality of non-vessel categories.

14. The operating method of claim 13, wherein the auxiliary recognizing mode comprises:
  step (S201): determining, by the processing module, whether the at least one image category of the at least one floating object is people of the plurality of non-vessel categories;

wherein if the at least one image category is determined to be the people, execute step (S2011); if the at least one image category is not determined to be the people, execute step (S202);

wherein step (S2011) comprises controlling, by the processing module, the camera to optically magnify the at least one floating object, and recognizing the at least one image category of the at least one floating object as the plurality of vessel categories or the plurality of non-vessel categories;

wherein if the at least one image category of the at least one floating object is determined to be the plurality of vessel categories, execute step (S102); if the at least one image category of the at least one floating object is determined to be the plurality of non-vessel categories, execute step (S2012);

wherein step (S2012) comprises recognizing, by the processing module, the at least one image category of the at least one floating object as the people of the plurality of non-vessel categories via the object recognition;

wherein if the at least one image category is determined to be the people, execute step (S1012); if the at least one image category is not determined to be the people, execute step (S202);

wherein step (S202) comprises controlling, by the processing module, the camera to determine the at least one image category of the at least one floating object to the plurality of non-vessel categories;

wherein if the at least one image category is determined to be the plurality of non-vessel categories, execute step (S203); if at least one image category cannot be recognized, execute step (S2021);

wherein step (S2021) comprises defining, by the processing module, the at least one floating object to at least one new object and notifying the system administrator; and wherein step (S203) comprises transmitting, by the processing module, the at least one floating object which is recognized as the plurality of non-vessel categories to the storage module for saving.

15. The operating method of claim 13, wherein the plurality of floating objects information are automatic identification system signals (AIS), and the plurality of floating objects information includes global positioning system coordination, vessel category, and maritime mobile service identity (MMSI).

16. The operating method of claim 15, wherein the plurality of floating objects information further includes vessel name, vessel velocity, vessel heading or combinations thereof.

17. The operating method of claim 12, wherein the plurality of vessel categories comprise airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof; and the plurality of non-vessel categories comprise people, buoy, driftwood or combination thereof.

18. The operating method of claim 12, wherein the plurality of vessel sample data comprise airfoil, hydrofoil, patrol vessel, local vessel, fishing, tug, ferry, dredger, cruise ship, naval ship, container ship, sailing vessel, bulk carrier, pleasure craft, tanker, hovercraft, submarine, search and rescue vessel, port tender, pollution control vessel, hospital ship, special vessel, pilot vessel, rubber boat, wooden boat, fish raft, sampan or combinations thereof; and the plurality of non-vessel sample data comprise people, buoy, driftwood or combination thereof.

* * * * *